Patented Apr. 19, 1927.

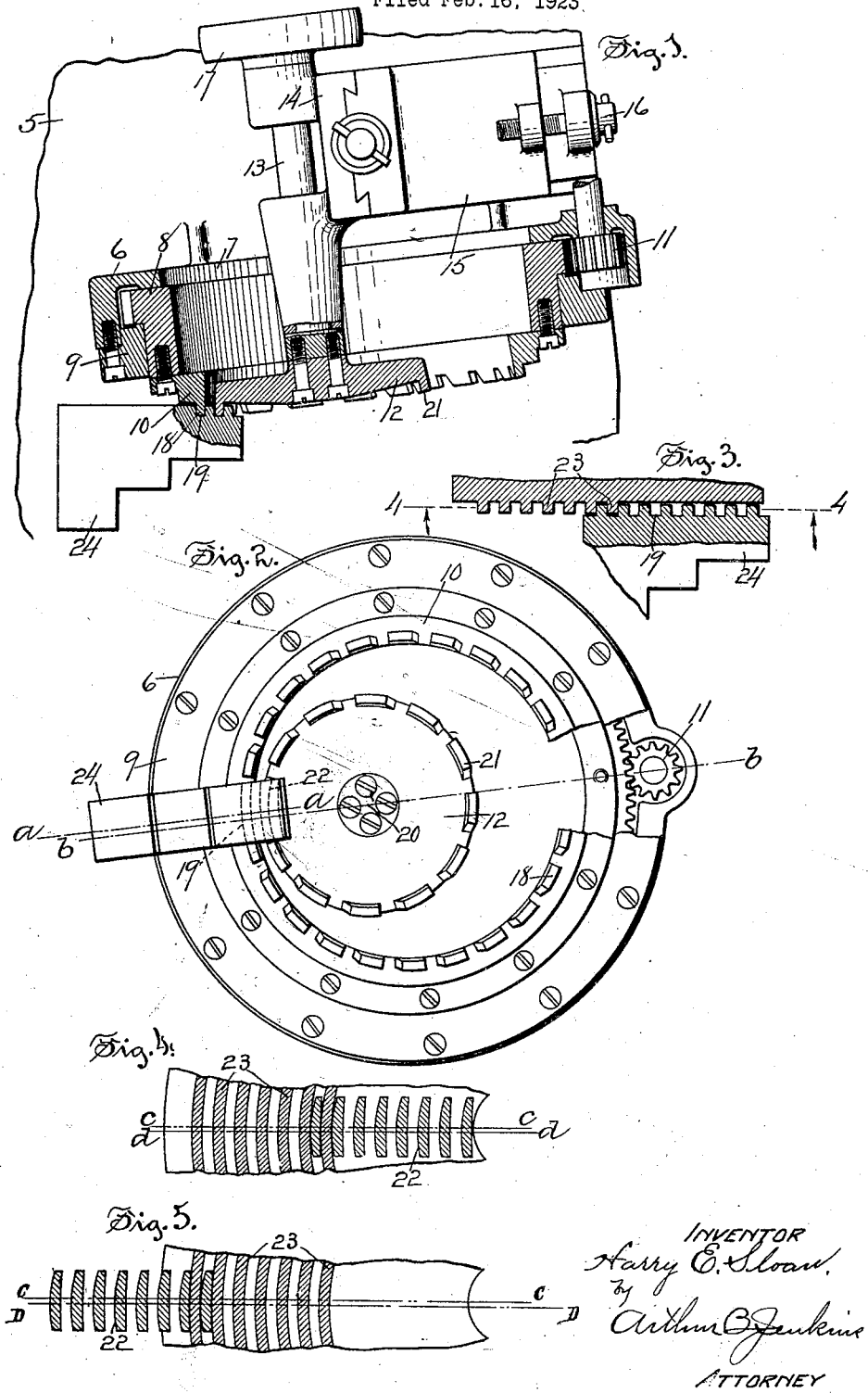

1,625,402

UNITED STATES PATENT OFFICE.

HARRY E. SLOAN, OF HARTFORD, CONNECTICUT.

RACK-TOOTH-CUTTING MACHINE.

Application filed February 16, 1923. Serial No. 619,515.

My invention relates to machines for cutting teeth comprising racks on the backs or bottoms of chuck jaws, and an object of my invention, among others, is the provision of a machine for cutting the teeth of a rack so formed that such rack will be most effectively engaged by a feed scroll, and at the same time which rack may be produced very rapidly; and a further object of the invention is the production of such a machine that shall be very simple in its construction and method of operation.

One form of machine embodying my invention and in the construction and use of which the objects herein set out, as well as others, may be attained, is illustrated in the accompanying drawings, in which—

Figure 1 is a view, looking down, of a portion of a machine embodying my invention, with parts broken away to show construction.

Figure 2 is a view in elevation of that part of the machine illustrated in Figure 1, with parts broken away to show construction. Figure 3 is a detail view, partially in section, in the direction of depth through a portion of a scroll and chuck jaw, showing the meshing of the scroll with the teeth of the chuck jaw.

Figure 4 is a view in section on a plane denoted by the dotted line 4—4 of Figure 3, showing the scroll and chuck jaw teeth in one position.

Figure 5 is a view similar to Figure 4, but showing the scroll and chuck jaw teeth in another position.

As is well known, the jaws of scroll chucks have teeth on their back or bottom surfaces formed for engagement with a feeding member in the shape of a scroll that is rotated to feed the jaws back and forth. A common practice in the production of these teeth on the chuck jaws has heretofore been to employ a hob with teeth formed on its flat face on the curve of the scroll that is subsequently to be employed to engage said feed for feeding purposes, the hob teeth, in fact, being formed by cutting away such a scroll at frequent intervals to form the hob teeth, and while these teeth are quite short yet they are of appreciable length, and the cutting edge is formed on the front or advance end of each tooth. In using such a hob to cut the teeth on the chuck jaws, the hob is secured to a rotating spindle and each chuck jaw is fed radially across the hob toward its center, a partial cut being thus formed on each tooth of the chuck jaw at each radial feeding movement thereof, and all of the teeth receive a partial cut at each of such feeding movements, the jaw holder being indexed at the ends of each of said feeding movements.

It will be noted that in the rotation of the hob to effect the cutting operations above described, the front and cutting end of each tooth on the hob that does the cutting travels on a circle of a greater radius than does the rear end, for the reason, as above explained, that such hob teeth are spirally formed. An objectionable result of this is that the rear end of each hob tooth, traveling on such smaller radius, has a binding action in the groove being cut to form the teeth on the chuck jaw, and the longer the hob tooth or the groove being cut the greater will be this binding action.

In my Patent No. 1,372,725, dated March 29, 1921, I have shown means for producing chuck jaw teeth that avoids the objections above noted, and in the device herein illustrated and described I have provided other and improved means for producing teeth on chuck jaws in a particular efficient manner and one to avoid the objection above mentioned.

In this, my newest and improved device, I employ a plurality of cutters, preferably independently operated, to cut the teeth on the chuck jaws, such cutters being supported on a frame 5, a portion only of which is shown herein, but that may be of any suitable form and construction. A housing 6 is formed as a part of or is rigidly secured to said frame and has an opening 7 through its back wall, said housing being adapted to receive a cutter support 8 that projects into the housing and is rotatably supported in a bearing ring 9 secured to the edge of the housing, as shown in Figure 1 of the drawings. A major cutter 10 is secured to the support 8, the latter being rotated in any suitable manner to produce cutting action of the teeth of the cutter. As shown herein gear teeth are formed at the base of the support 8, which teeth mesh with the teeth of a driving pinion 11 that is rotatably mounted in a wall of the housing 6, and that may be driven in any suitable manner, as from a source of power common to the machine as a whole, such driving connection, however, not being illustrated herein.

A minor cutter 12 is secured to a shaft 13 mounted in bearings on a supporting slide 14 vertically, adjustably mounted on a cutter base 15, the latter being horizontally adjustably mounted on the frame, such adjustment being as by means of an adjusting screw 16 engaged with said base and frame. The shaft 13 may be suitably driven in any desired manner, a pulley 17 to receive a belt being shown herein and which belt may extend from any suitable source of power.

I form the opposite faces of the chuck jaw teeth on arcs of circles of different radii, the radius on the inner side of each tooth, that is, on that side of the tooth that is intended to face toward the center of the chuck, and that contacts with the convex side of the scroll, being greater than on the opposite or outer side of the tooth and that contacts with the concave side of the scroll. As the scroll gradually decreases in radius toward its center I make the radius on the inner side of each tooth greater than the greatest radius of the feed scroll to be employed to feed the jaw, and I also make the radius on the outer side of each tooth less than the shortest radius of such feed scroll.

In forming teeth on chuck jaws as above described, cutter teeth 18 on the major cutter 10 are formed on the arc of a circle of a radius sufficient to produce the required curve, these teeth, in their operation, forming a groove 19 in the bottom of the chuck jaw, as shown by dotted lines in Figure 2. The minor cutter 12 is mounted on an axis 20 eccentric to the axis of the major cutter 10, this in order that the teeth 21 thereon and formed on a circle smaller than that on which the teeth 18 are formed, may cut the curved surface 22 of less radius on the outer face of the chuck jaw teeth.

In its operation the teeth of the cutter 12 merely cut away the metal at the outer ends of the outer surface of the teeth, the teeth 18 having previously effected, in their operation, the cutting of the groove and the surface comprising the center of the outer surface of said teeth.

It will be noted that the surfaces on the front and back of the chuck jaw teeth are formed on the arcs of circles and, therefore, that if such arcs of circles be evenly formed in the center of the chuck jaws the thrust of the spirally arranged scroll would not be along the center of the jaw but at one side thereof. Therefore, in order to transmit the thrust of such scroll along the center of the jaw 24 the radii of the circles are located at one side of the center line $a$—$a$ extending lengthwise through the chuck jaw, such radii being denoted by the dotted line $b$—$b$. A result of this is that when the scroll is acting upon the chuck jaw teeth the thrust of the scroll will be substantially on a line passing lengthwise through the center of the chuck jaws. This is graphically illustrated in Figures 4 and 5 of the drawing, whereas the thrust of the scroll 23 is along the lines $c$—$c$, and the radius of the curves on the chuck jaw teeth are denoted by the lines $d$—$d$.

In order to provide the curves on the chuck jaw teeth, as hereinabove described, the holder for the chuck jaws during the cutting operation is so located that such jaws are positioned at one side of the radius of the cutters, and as illustrated in Figure 2 of the drawings, wherein it will be noted that the line $a$—$a$ passing lengthwise through the center of the chuck jaw is at one side of the line $b$—$b$ representing the radii of the cutters.

The holder for the chuck jaws may be of any suitable form and construction and not, aside from its location, forming any part of the present invention, and it is not therefore shown herein. This holder in the machine herein shown is so arranged that when indexed to move the jaw after operation by the cutters, said jaw will be moved in a direction parallel with the frame, and in order that a bar, to be cut up into several of said jaws of indefinite length shall not interfere with the teeth on the opposite side of the cutter from that on which the cutting operation is being effected, the axis of the cutter is arranged at other than a right angle to the machine frame and as illustrated in Figure 1 of the drawing.

In accordance with the provisions of the patent statutes I have described the principles of operation of my invention, together with the device which I now consider to represent the best embodiment thereof, but I desire to have it understood that the device shown is only illustrative, and that the invention may be carried out by other means.

I claim—

1. A tooth cutting machine comprising a plurality of series of cutting teeth positioned to cut in substantially the same plane, the teeth of each series being arranged on a circle having a center different from that of another of the series, and means for independently operating the cutters.

2. A tooth cutting machine comprising a plurality of cutters each having teeth arranged thereon in a circle of a radius different from that of the teeth on another cutter, means for feeding an article for operation of said cutters and means for independently operating the cutters.

3. A tooth cutting machine comprising a plurality of cutters each having teeth arranged thereon in a circle of a radius different from that of the teeth on another cutter, means for simultaneously but indefinitely operating said cutters, and means for feeding an article for the operation of said cutters.

4. A tooth cutting machine comprising a plurality of cutters each having a row of teeth arranged thereon in a circle and of a radius different from that of the teeth of another cutter, one of said rows of teeth being located within the circle formed by the teeth of another row.

5. A tooth cutting machine comprising a plurality of cutters of different diameters, one located within and eccentric to the other, rows of cutting teeth on each of said cutters, one of said rows being of a radius different from that of another of said rows, and means for operating said cutters.

6. A tooth cutting machine comprising a plurality of cutters, each comprising a row of teeth circularly arranged, one of said rows being of different radius from and positioned to cut in substantially the same plane as another, said rows of teeth being spaced for operation upon opposite sides of a tooth to be formed, and means for operating said cutters.

7. A tooth cutting machine comprising a plurality of series of cutting teeth, the teeth of each series being arranged on a circle having a center different from that of another of the series and to cut in substantially the same plane as that of another of the series, and means for feeding an article and supporting it with its lengthwise center at one side of the radius of the cutter.

8. A tooth cutting machine comprising a plurality of series of cutting teeth positioned to cut in substantially the same plane, the teeth of each series being arranged on a circle having a center which is different from the center of a circle on which another series of said teeth are arranged, means for feeding an article for operation of said teeth, the axes of the teeth being arranged at other than right angles to the direction of movement of said article.

9. A tooth cutting machine comprising a plurality of series of cutting teeth positioned to cut in substantially the same plane, the teeth of each series being arranged on a circle having a center different from the center of another of the series, and means for supporting an article with its lengthwise center off the radius of said series of teeth, said means moving the article in a direction at an angle other than a right angle to said cutters.

10. The process of forming teeth that consists in effecting circular cuts from different centers simultaneously on opposite sides of each tooth and substantially in the same plane.

11. The process of forming teeth upon an article that consists in forming the opposite side surfaces of a tooth on the arcs of circles of the same radius and then changing one of said surfaces to form a circle on the same radius, but of a different length.

12. A tooth cutting machine comprising a plurality of cutters each having teeth arranged thereon in a circle having a center different from that of the teeth on another cutter and to cut substantially in the same plane, and means for feeding an article for operation of said cutters.

13. A tooth cutting machine comprising a plurality of cutters each having teeth arranged in a circle with a center different from that of the teeth on another cutter and to cut substantially in the same plane, means for simultaneously operating said cutters, and means for feeding an article for the operation of said cutters.

14. A tooth cutting machine comprising a plurality of cutters each having a row of teeth arranged thereon in a circle having a center different from that of the teeth on another cutter, one of said rows of teeth being located within the circle formed by the teeth of another row.

15. A tooth cutting machine comprising a plurality of cutters of different diameters, one located within and eccentric to the other, rows of cutting teeth on each of said cutters, one of said rows having a center different from that of another of said rows, and means for operating said cutters.

16. A tooth cutting machine comprising a plurality of cutters, each comprising a row of teeth circularly arranged to cut in substantially the same plane, one of said rows having a center different from that of another of said rows, and said rows of teeth being spaced for operation upon opposite sides of a tooth to be formed, and means for independently operating said cutters.

17. A process of forming teeth upon an article that consists in forming the opposite side surfaces of a tooth on the arcs of circles having different centers, and then changing the position of one of said surfaces to form a circle of a different radius.

HARRY E. SLOAN.